United States Patent

[11] 3,566,147

| | | | | |
|---|---|---|---|---|
| [72] | Inventor | Carl Johan Masreliez<br>Renton, Wash. | [56] | References Cited |
| [21] | Appl. No. | 706,883 | | UNITED STATES PATENTS |
| [22] | Filed | Feb. 20, 1968 | 2,881,832 4/1959 Leonard.................... 307/41 |
| [45] | Patented | Feb. 23, 1971 | 2,963,590 12/1960 Schultz et al. ............. 307/41 |
| [73] | Assignee | Atlas Copco Aktiebolag<br>Nacka, Sweden | 3,379,894 4/1968 Carsten.................... 307/41 |
| [32] | Priority | Feb. 21, 1967 | 2,864,049 12/1958 Sheets...................... 307/39X |
| [33] | | Sweden | 3,261,980 7/1966 McCartney et al. ......... 307/39X |
| [31] | | 2342/67 | |

Primary Examiner—Robert K. Schaefer
Assistant Examiner—H. J. Hohauser
Attorney—Eric Y. Munson

[54] CONTROL DEVICE FOR VARIABLE SEQUENTIAL CONNECTION AND DISCONNECTION OF PLANT COMPONENTS
10 Claims, 6 Drawing Figs.

[52] U.S. Cl............................................. 307/41, 307/39
[51] Int. Cl............................................. H02j 3/00
[50] Field of Search.................................. 307/41, 39, 38, 40, 42, 31, 32, 33, 34, 35, 11

ABSTRACT: A control device for plants comprising any number of electromotor-driven machines or equivalent units which comprises a corresponding number of supervising elements which in response to some operating characteristic of the plant connects one or more units in a certain sequence and disconnects them in an opposite sequence. After a predetermined time or due to some mechanical or manual impulse the sequence is changed so that the units are connected and disconnected in a new sequence. After repeated changes of sequence the device returns to the original sequence.

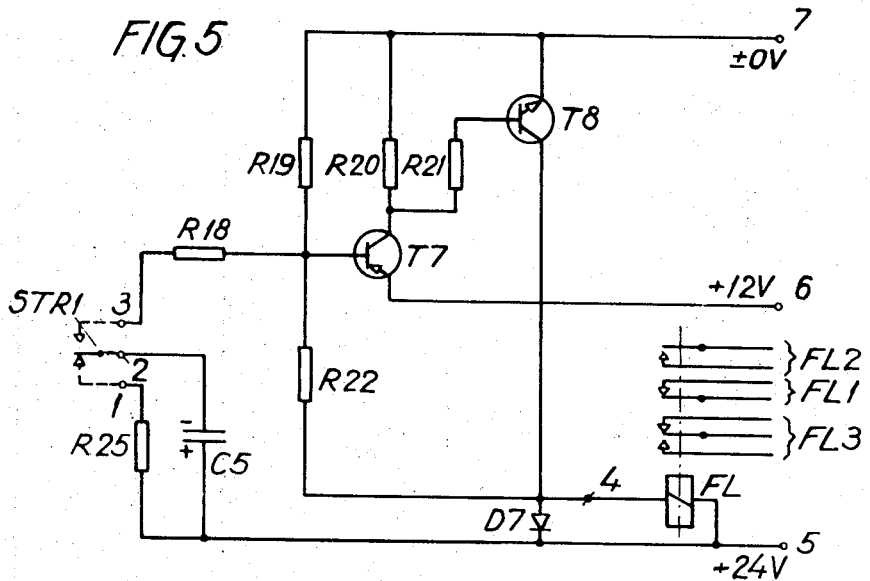
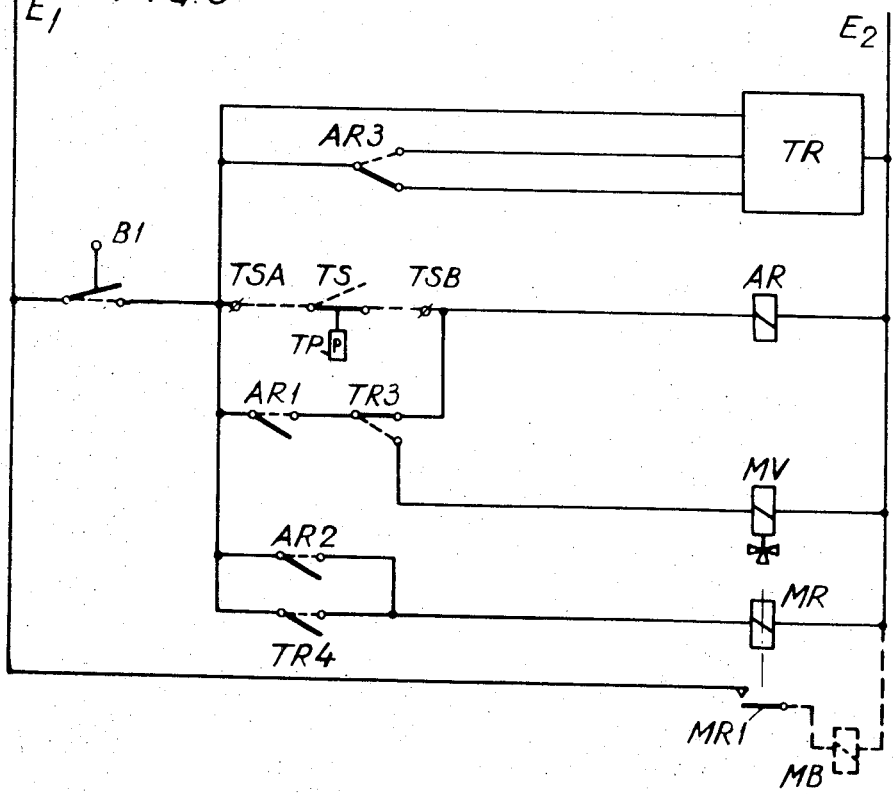

CONTROL DEVICE FOR VARIABLE SEQUENTIAL CONNECTION AND DISCONNECTION OF PLANT COMPONENTS

This invention relates to a control device for sequential connection and disconnection of a number of components of a plant as a function of a plant-operating characteristic. One object of the invention is, for instance, to connect a number of components which are necessary to maintain a certain pressure in a compressed air network, in a water supply network, in a pressure oil network, or to maintain a certain voltage in an electric network, a certain liquid level in a container or the like, and to prevent that a not desired uneven load or an uneven wear of the components is produced. The invention is substantially characterized by this that a variable number of components are arranged as to be connected in a certain sequence for maintaining a certain operating condition and thereafter to be disconnected in an opposite sequence and in which after a certain time or upon a certain actuation said sequence is changed so that said components, in order to maintain the said operating condition, are connected in another sequence and are thereafter disconnected in the opposite other sequence. The sequence may then preferably be changed again in such a manner that the original sequence is repeated cyclically.

The invention may preferably be carried out as an electronic control device which connects the components in response to a certain base voltage which depends upon the operating condition of the plant. The components may then, for instance, comprise electrically driven compressors, electromotor driven pumps or other machines or apparatuses which are driven electrically and/or the operation of which is controlled electrically in one way or the other. In such a plant it is often desirable that a certain component is not always allotted the same base voltage level since such an arrangement might lead to uneven wear of the components, for instance if the base voltage varies within a small part of the possible voltage variation range. In order to avoid this disadvantage the control device according to the invention is provided with electric means for changing the sequence of connection of the controlled components. An electronic control device according to the invention is substantially characterized by this that it consists of a number of plug-in units corresponding to the number of components provided in the plant, each one of said units containing a resistor which is arranged so as to be connected in series with corresponding resistors of other plug-in units to form a resistor chain which, with the exception of the resistor of the plug-in unit lying as number one in the prevailing sequence, divides a control voltage, the voltage level of which is a function of a base voltage depending upon the operating condition of the plant, in a number of divisional voltages, and said units also containing a preferably electronic switch, which senses the voltage level at the resistor and is arranged to connect or disconnect, respectively, one of the components, and said device also consisting of a sequence switching device which by feeding the control voltage to a certain plug-in unit having its resistor in said voltage dividing resistor chain determines which one of the plug-in units is going to be number one in the sequence. The sequence switching device may be caused to operate in various ways and may, for instance, be influenced by impulses from a timer or by manually produced impulses. Naturally, it is also possible to let another condition of the plant or another means in the plant produce the change of sequence, for instance a time recorder or a speedometer or a metering device for fluid delivered by or supplied to the plant.

A further object of the invention is to prevent simultaneous connection of several components, for instance at the start of the plant or due to rapid variations of the base voltage. If the components comprise electromotor driven machines, the electric currents might sometimes be very heavy. The control device according to the invention is consequently carried out in such a manner that the connection of the different components is delayed so that it is achieved with a certain time lag. Another object of the invention is to carry out the control device in such a manner that said time delay may be made inoperative in a simple manner. A still further object of the invention is to provide a control device which is built up by a number of plug-in units designed in such a manner that the number of components which may be connected to the control device may be varied within considerable limits.

In the accompanying drawings a control device according to the invention is illustrated diagrammatically by way of example. The illustrated control device should, however, only be considered as an example and the invention may be varied in many different ways within the scope of the claims. The control device illustrated in the drawings is particularly intended for control of a compressor plant comprising three electromotor driven compressors, the control device, however, being carried out in such a manner that it may be used without change for additional numbers of motor driven compressors unto ten. This number is naturally no limit and control devices according to the invention may be built for greater or smaller numbers of components as may be found proper.

Figure 1:
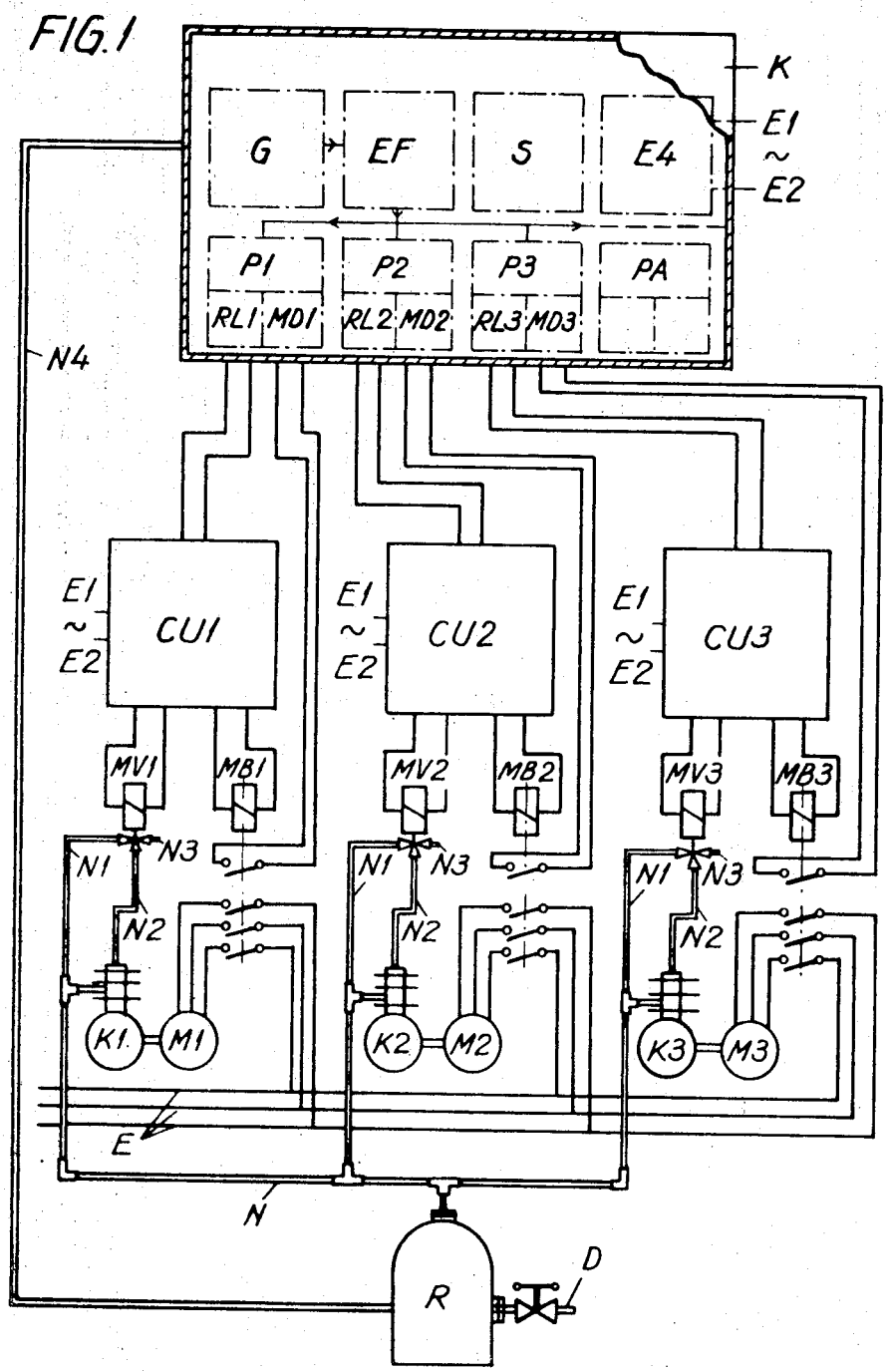
FIG. 1 illustrates diagrammatically the control device and the compressor plant controlled by said device.

FIG. 5 is a wiring diagram of a time delay circuit forming a part of the control device; and FIG. 6, finally, illustrates by way of example a wiring diagram of a control unit controlled by the control device. The compressor plant illustrated diagrammatically in FIG. 1 consists of three compressors K1, K2 and K3 each one driven by an electric motor M1, M2 and M3, respectively, and operating on a conduit network N which feeds a receiver R to which compressed air consuming apparatuses and machines are connected over a pipe line D. The motors M1, M2 and M3 are fed with current from a three phase network E over contactors operated by coils MB1, MB2 and MB3. The compressors are provided with conventional unloading mechanisms and electromagnetically operated valves MV1, MV2 and MV3 controlling the unloading mechanisms. The electromagnetic valves MV1, MV2 and MV3 are fed with compressed air from the network N through conduits N1 and connected to the compressors through conduits N2 leading to the unloading mechanism of the compressor and are furthermore provided with vent conduits N3. Every compressor is provided with a control unit CU1, CU2 and CU3, respectively, which is connected to the electrical network, for instance between two phase leads E1 and E2. The control units CU1, CU2 and CU3 are illustrated diagrammatically in FIG. 6, but they form no part of the present invention and may be carried out in various different ways and are therefore here described as examples only. Every control unit CU is provided with a manually operable switch B1 for connecting and disconnecting the control unit. The control unit CU according to FIG. 6 may be used without connection to a central control device and is then provided with a microswitch TS operated by a pressure sensing device TP which senses the pressure in the receiver R and closes the switch TS when the receiver pressure has decreased to a certain low value. When the control unit CU according to FIG. 6 is connected to a central control device according to the invention then the microswitch TS is disconnected and the control unit is instead connected at TSA and TSB to a plug-in unit which is indirectly influenced by the pressure in the receiver R. The function of the control unit, however, is the same as if the microswitch had been in operation. In the following description, therefore, the control unit for the purpose of simplification is described as if it had been provided with a microswitch TS.

When B1 is closed and the microswitch TS due to a certain low pressure in the compressed air receiver R is also closed then auxiliary relay AR is energized and closes contacts AR1, AR2 and shifts AR3. Auxiliary relay AR is then locked and current is supplied to an intermediate relay MR which at its contact MR1 closes the current supply to the motor contactor coil MB1, MB2 or MB3, respectively. The motor is consequently started and the compressor runs idle and since contact AR3 of the auxiliary relay AR has switched over to the dotted line position a time relay TR starts to count down the time for loading the compressor. As soon as ample time has passed and the compressor motor has reached the desired speed time relay TR closes its contact TR4 and its contact TR3 switches over to the dotted line position so that one of the electromagnetic valves MV is energized and interrupt the unloading of the pertaining compressor which is loaded and starts to deliver compressed air to the network and the receiver R.

When the pressure in the receiver R has risen to a predetermined value the pressure switch TS breaks its contacts so that auxiliary relay AR is deenergized and moves its contacts to the positions illustrated in the drawing so that the electromagnetic valve MV is deenergized and the compressor is unloaded. The time relay TR then starts to count the unloading time lag and after a certain time delay the relay TR opens its contact TR3 and TR4 is switched over to the position illustrated in the drawing so that the intermediate relay MR is deenergized, and MR1 opens. MB is then deenergized and opens its contacts and the motor stops.

The compressed air receiver R is connected through a conduit N4 to a pressure sensitive voltage transmitter G which transforms the pressure impulse from the receiver R into an electric voltage of a certain magnitude. The voltage transmitter G may principally consist of a rheostat G1, a membrane bellow G2 actuated by the pressure in the conduit N4 and operating against a spring G3 so as to move the contact G4 over the rheostat G1 to a position corresponding to the pressure in G2. The ends of the rheostat and the contact G4 are connected to an emitter follower circuit EF which is described in detail in connection with FIG. 3. The whole control device may preferably be mounted in a sheet metal casing K, FIG. 1, and is supplied with electric current from the line voltage leads E1, E2 over a voltage transmitter E4, which contains transformers, rectifier equipment and an overvoltage protection, and from which direct voltage may be obtained, for instance at o, 12 and 24 volts through the leads E5, E6 and E7. The overvoltage protection may preferably comprise a constant voltage device which within certain limits provides a predetermined constant direct voltage independent of the variations of the line voltage and the amount of current taken out. The control device according to FIG. 2 consists of the voltage transmitter G and the emitter follower circuit EF and a number of plug-in units P1, P2, P3 etc. corresponding to the number of motor driven compressors connected to the control device. A suitable control device may, for instance, be arranged for at the most 5 plug-in units or at the most 10 plug-in units or for another suitable number of plug-in units. Apart from the plug-in units P1, P2, P3 the control device includes an end circuit unit PA, a step-switch S, a synchronous timer STR and a time delay circuit F. Furthermore, the device contains a number of relays and connecting panels. As abovementioned the whole control device may preferably be provided and mounted in a casing which contains a frame a number of terminal panels for the plug-in units the end circuit unit, the time delay circuit etc.

The emitter follower circuit consists of three transistors T1, T2, T3 and a number of resistors R1—R8 and two potentiometers RH1 and RH2 and a further transistor T4. The resistors R1, R2 and R3 are connected in series with the potentiometer G1 in the voltage transmitter G. The base voltage V which represents the pressure level, i.e. the voltage between E5 and G4 is fed to the base of the transistor T1 which is connected as emitter follower. The transistor T2 is connected as a constant current device which has the result that the voltage over the potentiometer RH1 is substantially constant when the voltage on the base of the transistor T1 varies. The voltage V0 between the points 8 and 10 is consequently substantially constant whereas the voltage level is changed as G4 moves along G1. From the emitter T1 and the emitter T3 two low resistance outlets V1 and V2 with constant voltage difference are obtained. These voltages are fed through two resistors R5 and R6 to a voltage divider which consists of a number of resistors R9 provided in the various plug-in units as described hereinbelow. By means of the potentiometer RH1 the difference between the voltages from the emitter side of the transistors T1 and T3 may be adjusted and consequently the difference between the throw-in levels of the various plug-in units. The transistor T4 is connected as emitter follower and provides the control voltage of the throw-in and throwout hysteresis of the electronic switches as described in detail in connection with FIG. 4.

Figure 3:
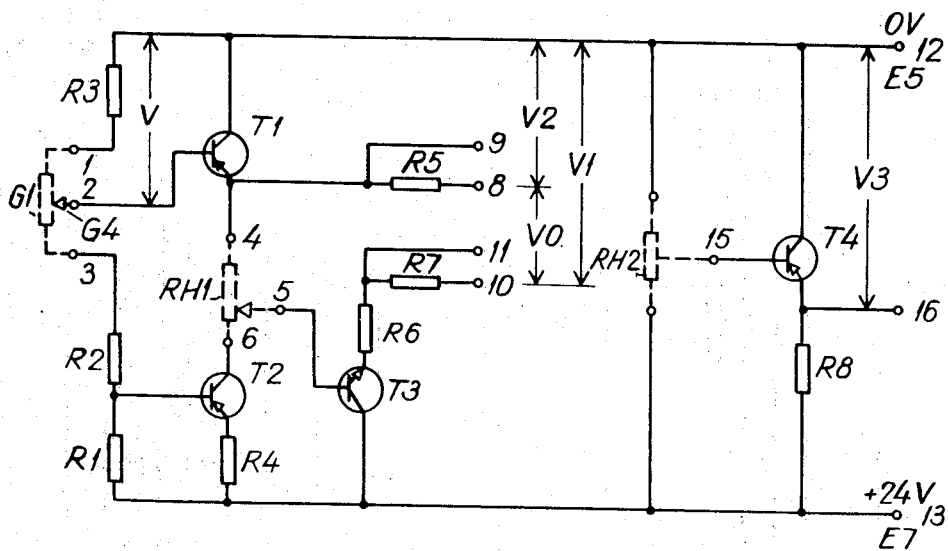
FIG. 3 is a wiring diagram of an emitter follower circuit forming a part of the control device.

The emitter follower circuit EF according to FIG. 3 and the plug-in units P are in the described embodiment carried out as wiring boards on which relays, resistors, transistors, diodes etc. are mounted and connected to circuits printed on the boards, the connecting points of the boards being numbered 1—16. The connecting points on each board correspond to connection points on the connecting panels etc. on the frame in the casing K.

Figure 4:
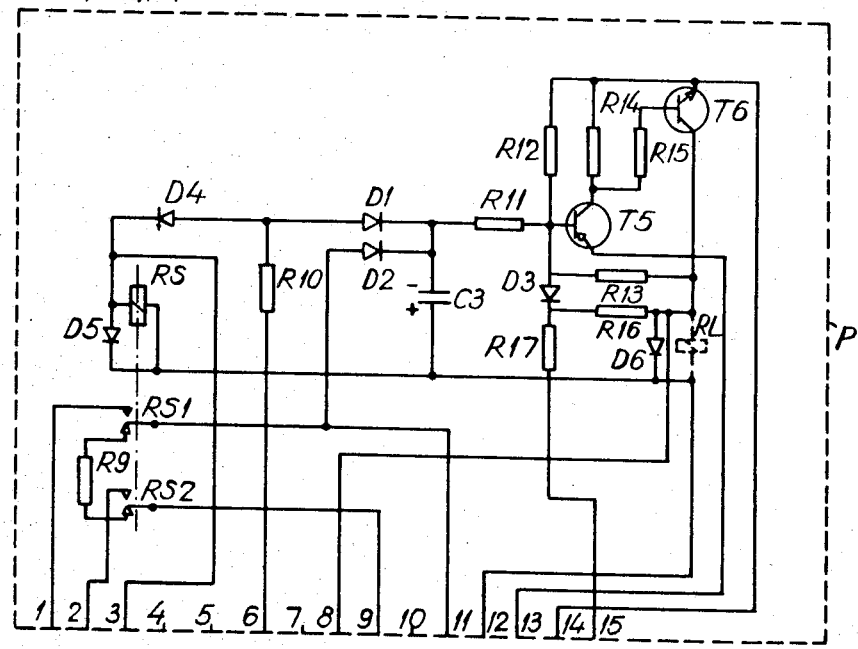
FIG. 4 is a detail wiring diagram of a plug-in unit forming a part of the control device.

FIG. 4 illustrates a wiring diagram of a plug-in unit P1, P2, P3 etc. of which one unit is provided for each compressor. As above described the plug-in units contain a resistor R9 which together with the corresponding resistors of the other plug-in units form a chain of resistors. The part of this resistor chain which is connected at a certain moment divides the voltage difference V0 between the contacts 8, 10 of the emitter follower circuit in a number of divisional voltages which are situated at different levels depending upon which plug-in unit is momentarily connected as number one in the sequence. The resistor R9 of the plug-in unit which is number one in the sequence is in the illustrated embodiment disconnected and the voltage V0 is instead connected over the rest of the resistors R9 which are connected in series when the control device is in operation. Furthermore, the plug-in units are provided with a sequence switching relay RS, the contacts RS1 and RS2 of which connects or disconnects respectively the resistor R9 into the voltage divider formed by the plug-in units in dependence of the fact if the sequence switching relay RS is deenergized or energized. The plug-in unit P in which the relay RS is energized will be number one in the sequence which is indicated by illumination of the indicator lamp L12 in the illustrated example. The change of sequence is produced by moving the current to the relay RS stepwise from one plug-in unit to another. This is achieved by the step-switch S which is described hereinbelow.

Sequence switching may also be achieved by keeping the ring of resistors R9 of the various plug-in units closed and by successively connecting the voltages at the contacts 8, 10 of the emitter follower circuit over one after the other of the resistors R9 of the ring. The voltage difference is then distributed over the rest of the resistors.

Each plug-in unit is provided with an electronic switch which consists of two transistors T5 and T6 both of which are simultaneously conductive or nonconductive. Transistor T5 receives control voltage through a diode D2 and resistor R11 to the base of the transistor. When T5 starts to be conductive the base of transistor T6 is also charged through resistor R15 whereupon T6 is conductive. The signal recieved is fed back through the resistors R13 and R16 and the diode D3 so that safe switching is achieved. The control voltage to the transistor T5 is compared with a voltage source E6 common for all plug-in units. The hysteresis, i.e. the voltage difference between on and off for the electronic switch is governed by the resistors R11, R12, R13, R16 and R17 and the voltage on the contact 15. By varying said voltage the hysteresis may consequently be changed. A diode D3 keeps the on-level of the electronic switch unchanged. When transistor T6 is conductive relay RL2 or RL3 etc. are energized. This relay is provided with a contact RL21 and RL31, respectively, which replaces the microswitch TS in the control unit CU according to FIG. 6, i.e. the contact RL11 etc. is connected between the points TSA and TSB in the control unit according to FIG. 6.

It may in certain cases be undesirable that the electronic switches of the various plug-in units operate simultaneously, and in order to avoid such a situation a locking circuit has been provided which involves that a switch can go in only a certain time after throwing in the preceeding switch. This is obtained by means of the resistor R10 and the capacitor C3. The input to resistor R10 is through a contact MD11, MD21 or MD31, respectively, connected to the collector of the transistor T6 of the preceeding plug-in unit. This means that a certain electronic switch cannot go in before the switch of the preceeding plug-in units is in since the voltage on the base of the transistor T5 is kept high through the connection with the collector of the transistor T6 of the preceeding plug-in unit through the resistor R10 and the diode D1. The diode D2 is then usually supplied in reverse direction. When the preceeding unit is thrown in the diode D1 is also charged in the reverse direction. The capacitor C3 is charged through the resistor R11 R12 and R13 and the locking circuit is broken when D2 starts to be conductive or when the electronic switch goes in. The time delay may be removed by breaking the contacts MD11, MD21 or MD31, respectively, by closing a switch MD6—9.

Since each plug-in unit is locked by the immediately preceeding unit the locking circuit must be broken in the unit which is number one in the sequence in order to make possible that throwing-in of the switch takes place. This is achieved by supplying the negative control voltage to RS through the diode D4 to the resistor R10. The diode D1 is hereby charged in reverse direction and the locking circuit is broken. The resistor R10 is made so large that the relay RL of the preceeding plug-in unit is not influenced.

It is obvious from the preceeding description that the various plug-in units are mutually alike and are connected in a ring with respect to the resistors R9 and the above-described mutual time lag. In order to make it easy to add units to the device it is necessary to provide an end circuit formed as an extra plug-in unit. Said end circuit unit is in FIGS. 1 and 2 designated PA. The change of sequence is carried out by a step switch which has one contact 1, 2, 3, etc. for connection of each one of the plug-in units in which it is connected at the contact 3. Through said contact is also fed an indicator lamp L11, L12, L13 etc. which is lighted at the plug-in unit which is number one in the sequence.

Figure 2:
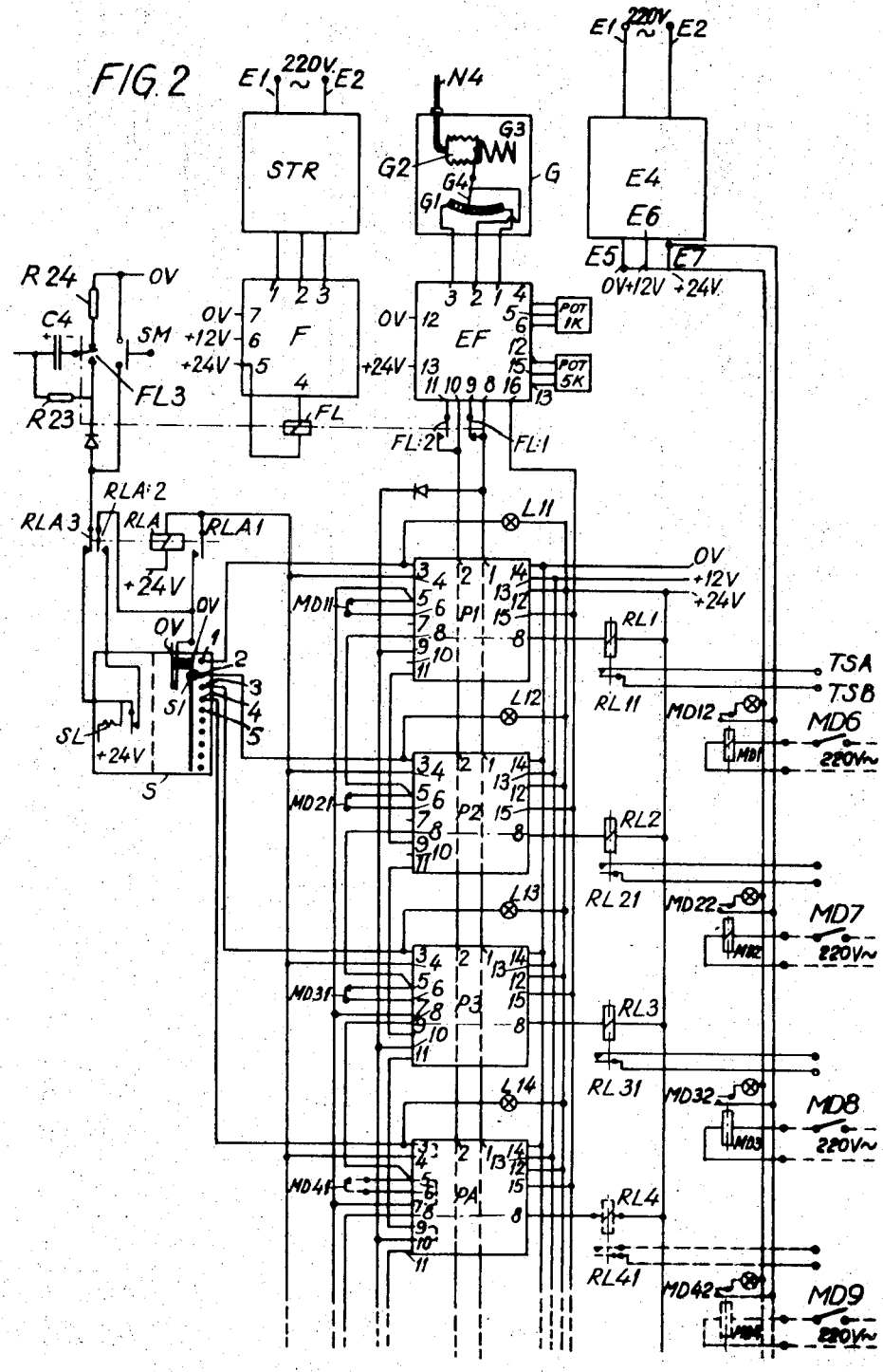
FIG. 2 is a detail view and partially diagrammatic illustration of a wiring diagram for a control device according to FIG. 1.

As above-mentioned, an end circuit unit PA forms a part of the control device the wiring of the unit PA being illustrated diagrammatically in FIG. 2. The end circuit unit PA only serves to complete the chain of plug-in units, i.e. to connect the last plug-in unit to the first unit so that a closed chain is formed. The end circuit unit PA is in the same manner as the other plug-in units connected to the step switch S and said connection is arranged at the contact which follows after the other plug-in units, i.e. in the described example at the contact 4 of the step switch S. When the step switch connects the end circuit unit current is supplied through contacts 3, 4 in the end circuit unit to a step switch advancing relay RLA which is locked over a contact RLA1 and moves the step switch home to contact 1 through actuation of contact RLA2. Consequently, the step switch again connects the plug-in unit P1 when its contact S1 is connected to the connection 1 of the step switch.

As above indicated the change of sequence is caused by feeding the relays RS of the plug-in units successively with voltage. This voltage is obtained from the step switch S which is moved forward through electrical impulses from the capacitor C4 or through a manually operable contact SM. The pulses to the step switch may be fed directly to the coil SL, for instance upon manual change of the sequence by means of the switch SM. Sometime, however, it is desirable to connect in advance the plug-in unit which is just about to be connected. For this purpose a time delay circuit according to FIG. 5 may be used. The time delay circuit F according to FIG. 5 and 2 is connected to an automatic timer STR which may comprise a synchronous motor which, for instance, makes one revolution in 6 hours and which for each revolution switches over its contact STR1. A capacitor C5, FIG. 5, is normally short-circuited by the changeover contact STR1 over resistor R25 and a relay FL is energized. When it is desired to change sequences C5 is connected to the inlet of a voltage level-sensing switch over contact STR1 causing the level switch to change from conductive to nonconductive condition. The level switch consists of two transistors T7 and T8 and a number of resistors R18- —R22. The relay FL of the time delay circuit is then deenergized, and the contacts of said relay takes the positions illustrated in FIGS. 2 and 5 and the capacitor C4 is charged through a resistor R24 and a changeover contact FL3 of the relay FL. In the emitter follower circuit the connections 8 and 9 are simultaneously connected whereas the connection between connections 10 and 11 is broken. Since R5 and R7 are of the same size as R9, the input voltage to all switches in the plug-in unit is reduced with an amount corresponding to the partial voltage difference between two consecutive plug-in units. Here usually a further plug-in unit is thrown in. When C5 is charged so that the switch of the time delay circuit has reached the on level then the coil FL is again energized. The capacitor C4 is then discharged through the coil SL of the step switch which is advanced one step if the end circuit unit PA is not connected in which case the step switch returns home. Then a change of sequence is caused. Simultaneously the connection between the points 8 and 9 in the emitter follower circuit and the points 10 and 11 in the same circuit are short circuited.

When the changeover contact STR1 returns to the position illustrated in FIG. 5 capacitor C5 is discharged whereas FL is still energized. Through operation of the changeover contact STR1 by means of a synchronous motor, as above described, or by means of a cam disc or the like a change of sequence is obtained with even time intervals.

The control device according to the invention functions in the following way in connection with a compressor plant of the type illustrated in FIG. 1.

Let the control device take the position illustrated in FIG. 2 with the only difference that FL is energized and the compressor plant is at rest. Due to compressed air consumption in the network D the pressure in R decreases so that G4 takes a position which causes P2 to start the compressor K2 M2. Now, if the pressure continues to decrease then P3 will after a certain time delay start the compressor K3 M3 and if the pressure still continues to decrease than P1 after a certain time delay starts. Then, if the pressure rises the compressor K1 M1, K3 M3 and K2 M2 in the mentioned sequence are unloaded and after certain time delays are stopped. This cycle of operation is repeated in the mentioned sequence until a change of sequence is caused.

If the change of sequence is operated automatically by the timer STR then the step switch S, for instance after 6 hours, is advanced one step, i.e. from the connection 2 to the connection 3. The next time the pressure sinks below the sa starting value, the compressor K3 M3 is started and thereafter if necessary, the compressors K1 M1 and K2 M2. This sequence is then maintained until the timer STR for instance after another 6 hours again produces a change of sequence.

The step switch then moves the contact S1 to the connection 4 which causes the plug-in unit PA to be connected. This causes the step switch to go home to the connection 1 so that now the plug-in unit P1 and the compressor K1 M1 is number one in the sequence. By manual operation of the contact SM it is at any time possible to cause a change of sequence one step.

The control device above described should only be considered as an example and may be varied in its details in several different ways within the scope of the claims. The illustrated device is transistorized but may naturally in suitable details be carried out with triodes and diodes which however results in a much more cumbersome and current consuming device.

I claim:

1. A control device for the sequential connection and disconnection of components of a plant as function of a plant-operating characteristic, comprising means for connecting a variable number of said components in a predetermined sequence for maintaining a specific operating condition and for subsequent disconnection of said components in an opposite sequence, means for changing the sequence in response to a predetermined condition so that the components, in order to maintain said operating condition, are connected in another sequence and subsequently disconnected in the opposite other sequence, said device further including a plurality of supervising elements, each of said supervising elements being connected sequentially to a respective component and adapted to actuate said component in response to the supply of a predetermined partial voltage being a function of said plant operating characteristic to said element, a step switch for connecting one of said supervising elements to a starting component in the sequence and means for actuating said step switch to connect another component as a starting component.

2. An electronic control device for the sequential connection and disconnection of the components of a plant as function of a plant-operating characteristic, said device including a number of supervising elements which consist of a number of plug-in units corresponding to a number of components provided in the plant, each one of said units including a resistor, said resistors being connected in series with corresponding resistors of said other plug-in units to form a resistor chain which, with the exception of the resistor of the plug-in unit located at the starting unit in the prevailing sequence, divides a control voltage, the voltage level of which is a function of a base voltage, depending upon the operating condition of the plant, in a number of partial voltages, each of said units having a switch for sensing the voltage level at the resistor, said switch being adapted to actuate one of the components, said device also including a sequence switching device for feeding the control voltage to a predetermined plug-in unit having its resistor in said voltage dividing resistor chain, and to determine which one of the plug-in units is to be the starting unit in the sequence.

3. A control device for the sequential connection and disconnection of components of a plant as function of a plant-operating characteristic, means by which a variable number of said components are electrically connected in a certain sequence for maintaining a specific-operating condition, means to thereafter disconnect said components in an opposite sequence, said means being effective in response to an impulse condition to change the sequence so that the components, in order to maintain said operating condition, are connected in another sequence and thereafter are disconnected in the opposite other sequence, each of said components including a resistor, said resistors being connected in series with the resistors of said other components to form a resistor chain, which with the exception of the resistor of the component located as the starting component in the sequence, divides a control voltage, the voltage level of which is a function of a base voltage, depending upon the operating condition of the plant, in a number of partial voltages, each of said components having a switch for sensing the voltage level at the resistor, said switch being adapted to actuate one of the components, said device also including a sequence switching device for feeding the control voltage to a predetermined component having its resistor in said voltage dividing resistor chain, and to determine which one of the components is to be the starting component in the sequence.

4. Electronic control device according to claim 2, characterized by the provision of an emitter follower circuit (T1, T3) arranged so as to transform said base voltage (V) to two auxiliary voltages (V1, V2) which are functions of the base voltage and preferably have an adjustable constant voltage difference VO, which voltage difference forms the control voltage which is divided by the resistor chain (R9) with the exception of the resistor R9 of the plug-in unit (P) which momentarily is number one in the sequence.

5. Electronic control device according to claim 2, in which said sequence switching device consists of a step switch and a sequence switch in each plug-in unit, said sequence switches of the various plug-in units being arranged so as to be connected in turn to the various contacts of the step switch.

6. Electric control device according to claim 2, in which the sequence switching device is arranged by changing the control voltage level to connect an extra component at the switching before switching occurs and to cause that an earlier connected component is thereafter disconnected.

7. Electronic control device according to claim 2, in which it is provided with a time delay circuit arranged so that the starting of a certain component from stand still takes place with a certain time lag after sequence switching, a capacitor being for this purpose charged before an electronic switch in the circuit is thrown in.

8. Electronic control device according to claim 2, in which each plug-in unit has a time delay device arranged so as to prevent simultaneous throwing in of two components by causing one component to be connected with a certain time lag after the preceeding component has been connected.

9. Electronic control device according to claim 2, in which the connection between said time delay device and the immediately preceeding plug-in unit is arranged so as to be interrupted, for instance in dependence of an operating condition of the pertaining component.

10. Electronic control device according to claim 1, in which the connection and disconnection hysteresis of a switch which produces the connection and disconnection of components is made variable by variation of a control voltage common for a number of plug-in units.